May 24, 1955

E. C. OHNSTAD 2,708,891

PLANTER

Filed May 6, 1950

INVENTOR
ELMER C. OHNSTAD
BY
ATTORNEY

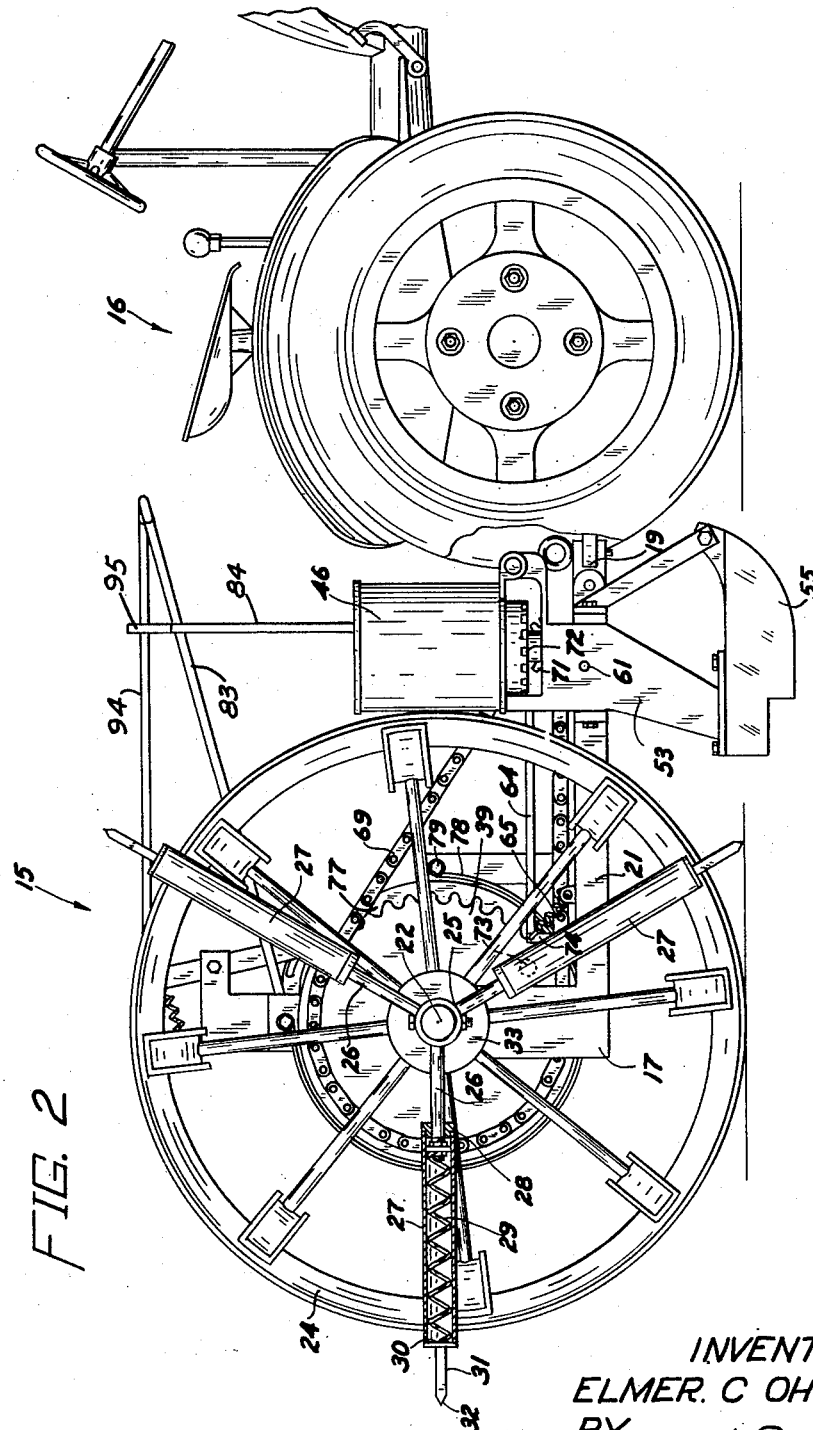

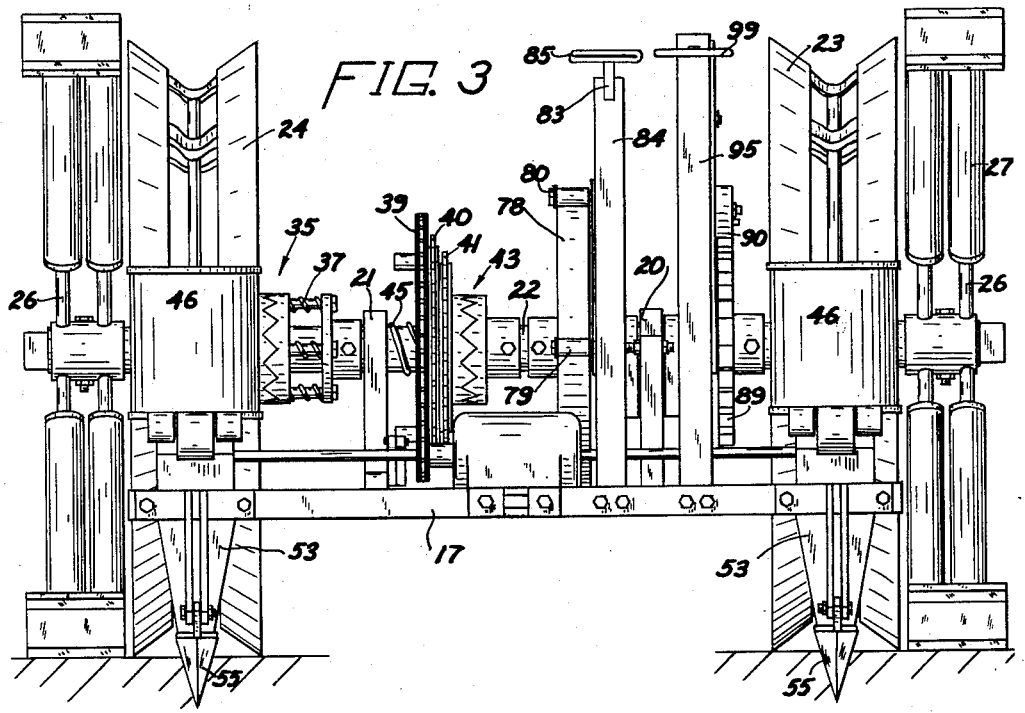
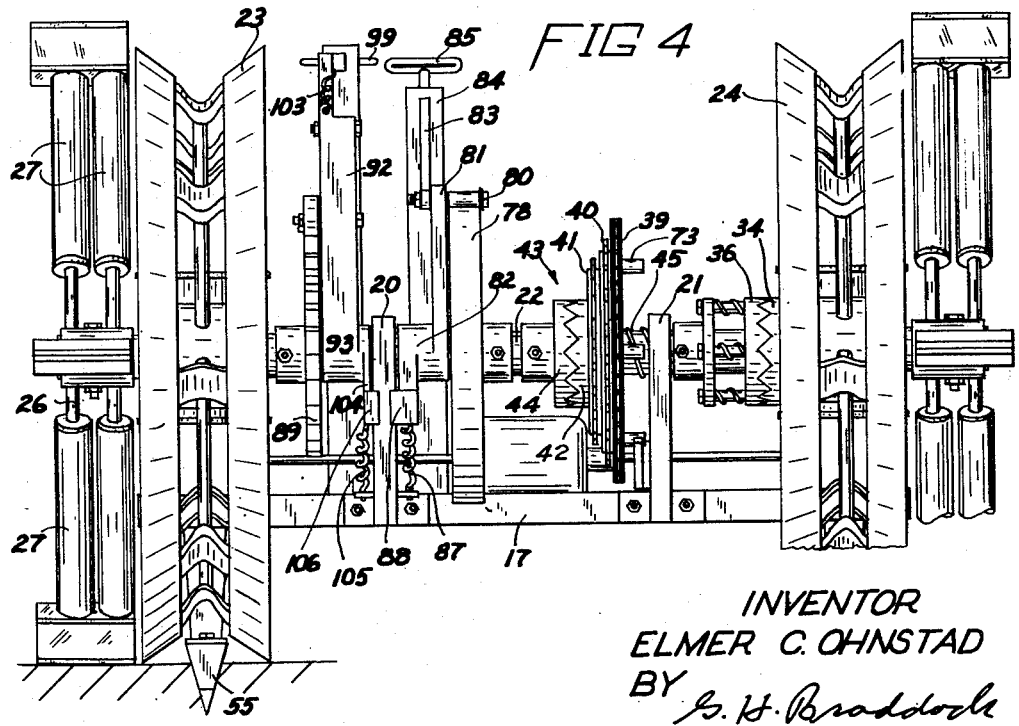

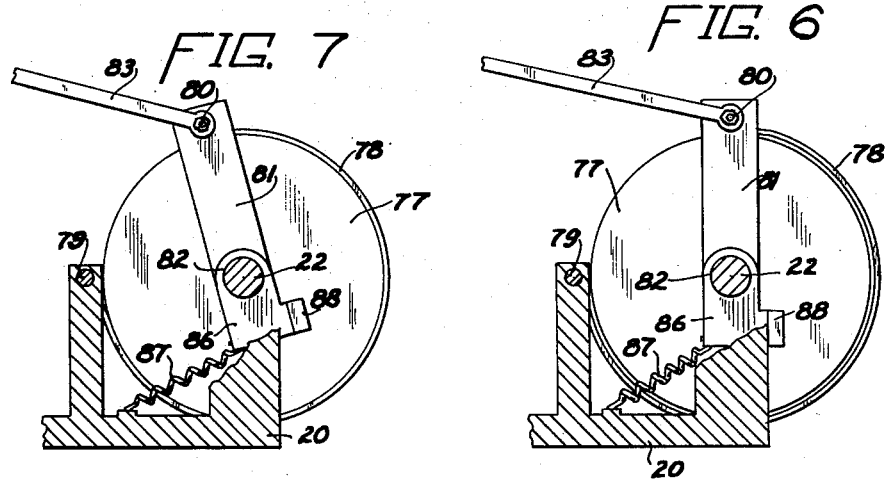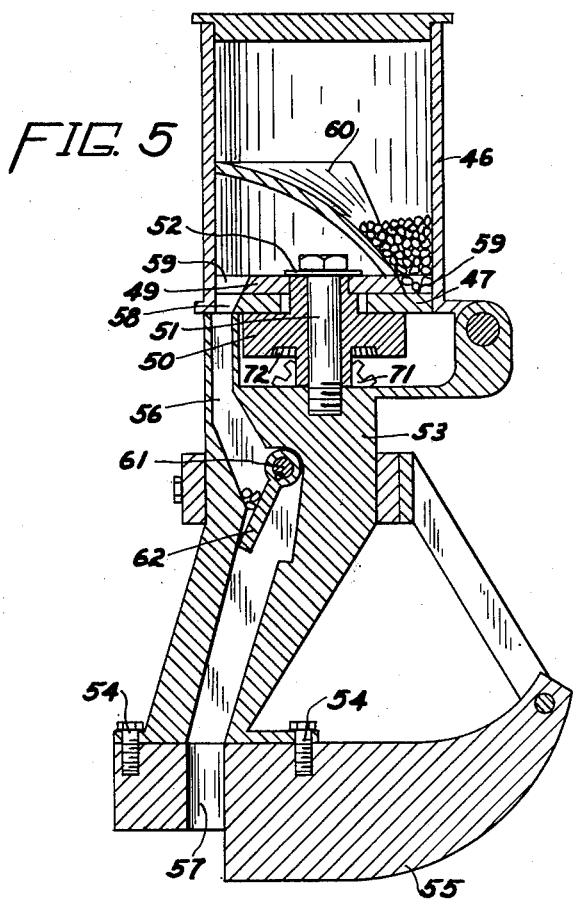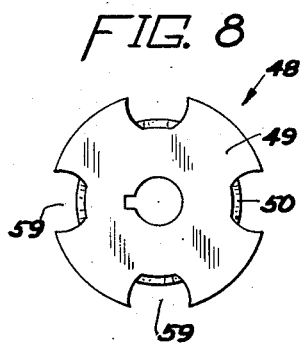

May 24, 1955     E. C. OHNSTAD     2,708,891
PLANTER

Filed May 6, 1950                        5 Sheets-Sheet 5

INVENTOR
ELMER C. OHNSTAD
BY B. H. Braddock
ATTORNEY

United States Patent Office 2,708,891
Patented May 24, 1955

2,708,891

PLANTER

Elmer C. Ohnstad, Minneapolis, Minn., assignor of one-half to John V. Palmer, Minneapolis, Minn.

Application May 6, 1950, Serial No. 160,510

1 Claim. (Cl. 111—16)

This invention presents a planter for seed, such as corn, soy beans, peas, etc., equipped with mechanism of new and improved construction through the instrumentality of which the seed can be planted in equidistantly spaced, parallel rows and equidistantly spaced, alined hills to the end that the soil can be readily and easily worked while the crop is growing to maturity. In practical operation of the planter, the different hills of seed in a row can be planted at the same distance apart as are the different planted rows of seed, or the equidistant spacing between the planted hills of a row can be greater or less than the equidistant spacing between the planted rows.

An embodiment of the invention as herein illustrated and described has been devised to be especially useful for the purpose of planting corn kernels or seed in equidistantly spaced, parallel rows and equidistantly spaced, alined hills.

In the accompanying drawings forming a part of this specification,

Fig. 2 is a side elevational view, partially in section, of the planter as it would appear from the right in Fig. 1;

Fig. 3 is a front elevational view;

Fig. 4 is a rear elevational view;

Fig. 5 is an enlarged vertical longitudinal sectional view, taken on line 5—5 in Fig. 1, detailing features of the invention;

Fig. 6 is a detail sectional view, taken on line 6—6 in Fig. 1;

Fig. 7 is a view corresponding generally with the disclosure of Fig. 6, but showing parts in different positions;

Fig. 8 is an enlarged top plan view of a feed control or drop plate unit of the planter;

Figure 1:
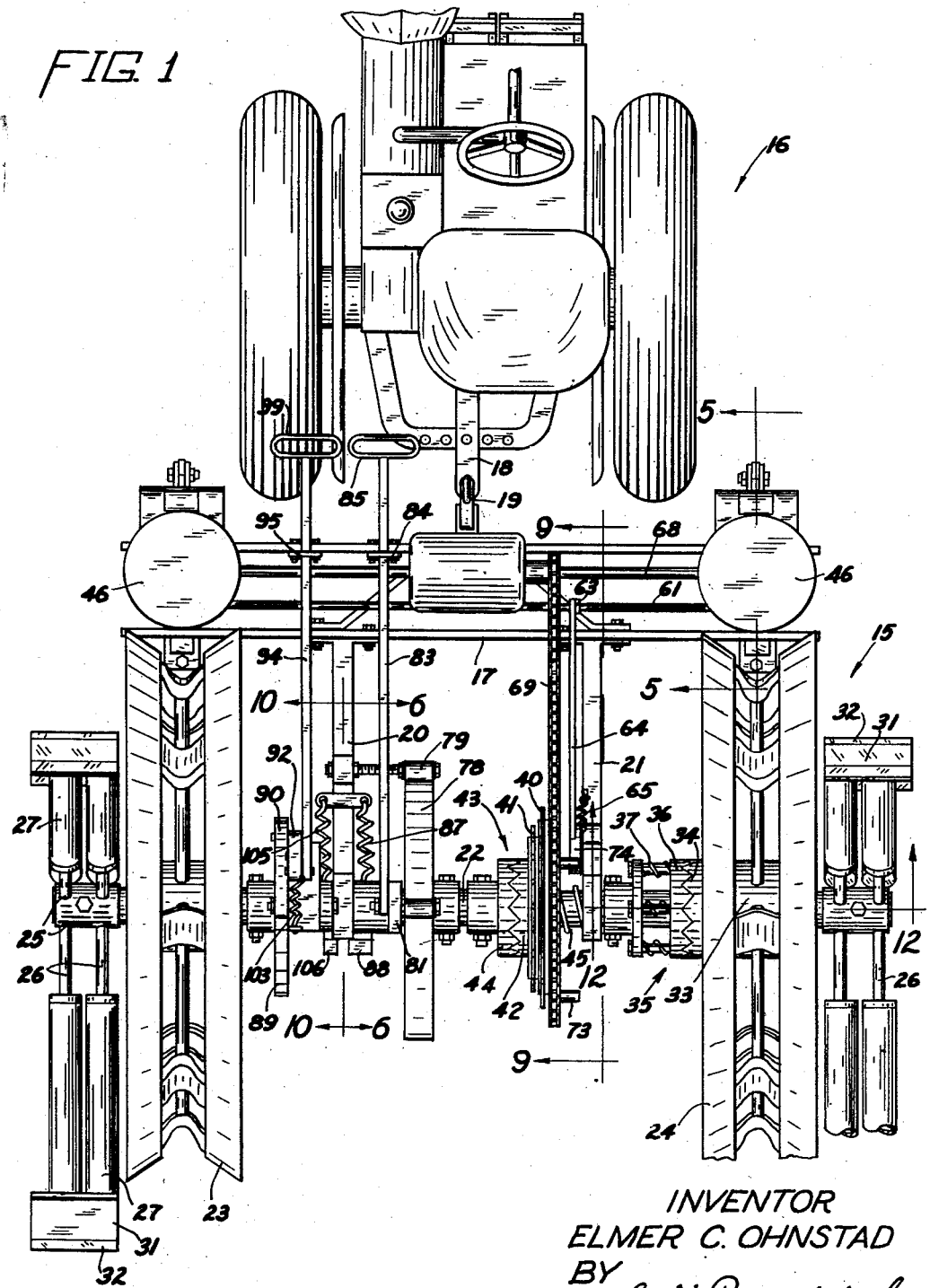
Fig. 1 is a top plan view, partially broken away, of a planter incorporating the features and characteristics of the invention.
Figure 9:
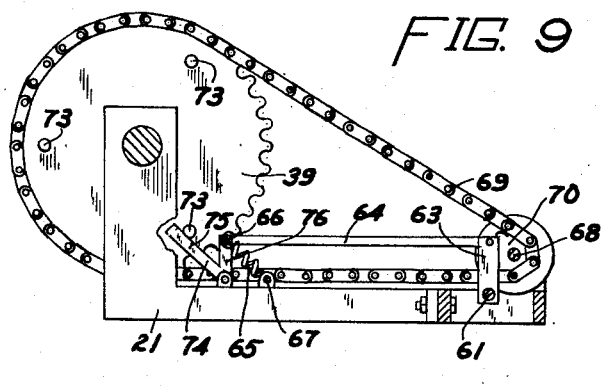
Fig. 9 is a vertical longitudinal sectional view, taken on line 9—9 in Fig. 1.

With respect to the drawings and the numerals of reference thereon, 15 denotes a planter made according to the invention, and 16 represents a tractor for accomplishing propulsion of the planter.

A frame 17 of the planter includes a forward portion to the center of which a draw bar 18 of the tractor is universally connected, as at 19, and said frame also includes rearwardly and upwardly extending, spaced, parallel beams, indicated 20 and 21, respectively, rotatably supporting a transverse axle 22 of said planter which extends the full width thereof and is rotatably mounted in both a left idler wheel 23 and a right drive wheel 24 of the planter.

As disclosed, the wheels of the tractor are disposed interiorly of the wheels of the planter. Said planter and tractor are universally connected in order that a usual or preferred type of hydraulically operated mechanism (not shown) upon the tractor can be employed to accomplish bodily lifting of the planter to remove its wheels and operating mechanism from the ground, as when said planter is to be moved from place to place while inoperative.

Each of a pair of sets of markers of the planter, disposed outwardly of its wheels 23 and 24, includes three markers, spaced at 120 degrees apart, fixedly secured, as at 25, upon the corresponding end of the transverse axle 22. Each marker is constituted as a pair of radially extending, spaced, parallel rods 26 having their interior ends rigid with said transverse axle, a pair of radially extending, spaced, parallel cylinders 27 having their interior ends slidably disposed, as at 28, upon the exterior end portions of the rods 26, compression coil springs 29 between the exterior ends of said rods 26 and closure walls 30 upon the exterior ends of the cylinders 27 normally urging said cylinders radially outwardly, and a transversely extending knife 31 with sharpened edge 32 rigid with the exterior end walls of the cylinders 27. The sharpened edges 32 of the knives 31 are adapted to be resiliently forced into the ground in response to rotating advancement of the transverse axle 22 and to leave equidistantly spaced indentations or marks each of which is to be indicative of a location, at the inner side of the indentation or mark, where a hill is to be planted.

Figure 12:
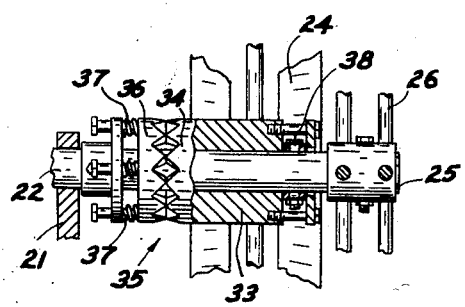
Fig. 12 is a vertical transverse sectional view, taken on line 12—12 in Fig. 1.

A hub 33 of the right drive wheel 24, rotatably supported upon and rotatably supporting the transverse axle 22, integrally or rigidly supports an inwardly facing first friction clutch element 34, at the inner end of said hub, of a slip clutch 35. An outwardly facing second friction clutch element 36 of the slip clutch 35 is rigid with said transverse axle. The first and second friction clutch elements 34 and 36 of said slip clutch 35 are constituted as interengaging serrated surfaces resiliently held in engagement by compression coil springs 37 of the slip clutch which are rotatable with the transverse axle 22 and the second friction clutch element 36 as a unit. Said transverse axle is suitably and conveniently retained in the hubs of the left and right wheels against the possibility of longitudinal movement, as by cross-pins 38, one of which is shown in Fig. 12, and the compression coil springs 37 resiliently urge the second friction clutch element 36 outwardly toward the first friction clutch element 34.

A set of rigidly connected sprockets, denoted 39, 40 and 41, of different sizes is rotatably supported upon the transverse axle 22 at the side of the beam 21 opposite the friction clutch 35 and suitably and conveniently fixed against movement longitudinally of said transverse axle. An inwardly facing first clutch element 42, at the inner side of the set of sprockets, of a clutch 43 is integral or rigid with said set of sprockets and held in engagement with an outwardly facing second clutch element 44 of said clutch 43, rigid with the transverse axle 22, by a compression coil spring 45. The first and second clutch elements 42 and 44 of the clutch 43 also are constituted as interengaging serrated surfaces resiliently held in engagement by the compression coil spring 45, but whereas the first and second friction clutch elements 34 and 36 of the slip clutch 35 are adapted to be forcibly slid the one over the other to accomplish adjustments in the machine during its operation, or while in use, in a manner to be made plain, the first and second clutch elements 42 and 44 of the clutch 43 are constructed to remain permanently engaged while the machine is operative, or in use, said clutch 43 being included in the structure for the purpose of making possible the accomplishment of initial adjustment in the machine while at rest, also in a manner to be set forth.

The compression coil spring 45 resiliently urges the second clutch element 44 inwardly toward the first clutch element 42.

The frame 17 of the planter suitably and conveniently rigidly supports, at a forward portion thereof, a pair of vertically disposed, spaced hoppers 46, 46, in front of and longitudinally alined with the wheels of said planter as disclosed.

A base wall 47 of each hopper 46 rotatably supports a feed control or drop plate unit 48 consisting of a drop or seed plate 49 within the hopper, a disc element 50 beneath said hopper, and a screw bolt 51 with washer 52 securing the drop or seed plate 49 and the disc element 50 to each other. The screw bolt 51 of each unit 48 extends down into a vertical member 53 rigid with the frame 17, and said vertical member rigidly supports, as at 54, a furrow blade 55 of ordinary or preferred construction. The screw bolt 51 retains the washer 52 down against the upper surface of the drop or seed plate 49 while resting upon the upper surface of the base wall 47, and also retains the disc element 50 up against the lower surface of said base wall 47. A passage 56 leads down through each vertical member 53 from the base wall 47 of the corresponding hopper 46 to a passage 57 through a rearward portion of the corresponding furrow blade 55, and said base wall 47 includes an opening 58 adjacent a rearward portion of the corresponding hopper which is contiguous with the upper end of the passage 56. Each drop or seed plate 49 includes equidistantly spaced concavities 59 in its periphery, situated adjacent the internal cylindrical surface of the corresponding hopper 46, and a shield 60 in each hopper is for directing seed, such as kernels of corn, to be capable of engaging only a portion of the upper surface of the seed or drop plate which is diametrically opposite the opening 58 in the base wall 47. The disc element 50 of each unit 48 is adapted to be rotated, in a manner to be set forth, thus to accomplish rotational movement of the seed or drop plate 49 of the unit, and rotational movement of said seed or drop plate 49 is adapted to successively situate each concavity 59 in vertical alinement with the opening 58 of the corresponding base wall 47, thus to successively deliver seed or kernels of corn deposited in the different concavities to the upper end of the passage 56 whence said seed or kernels of corn will fall by gravity through an upper portion of said passage 56. The shield 60 will preclude travel of the seed or kernels of corn to the opening 58 except those that enter the concavities 59.

Each vertical member 53 rotatably supports a horizontal shaft 61, extending between said vertical members, which in turn fixedly supports gate valves 62, including a gate valve situated in each passage 56. Each gate valve 62 normally is retained in closed position, as in Fig. 5, to preclude dropping of seed or kernels of corn through the lower portion of the passage 56 and through the passage 57 to the ground, through the instrumentality of a lever 63 rigid with the shaft 61, a link 64 secured to said lever and a tension coil spring 65 having one of its ends secured, as at 66, to the link 64 and its other end secured, as at 67, to the beam 21. Mechanism, presently to be described, is included to accomplish intermittent opening of the gate valves 62, between successive feedings of the contents of adjacent concavities 59 to the passages 56, thus to accomplish successive and intermittent dropping to the ground of the seed or kernels of corn trapped by the gate valves 62.

A transverse shaft 68, suitably and conveniently mounted on a forward portion of the frame 17, is adapted to be rotated in response to rotation of one of the sprockets 39, 40, 41, depending upon which of said sprockets is being employed, and to this end a drive chain 69 mounted upon a sprocket 39, 40 or 41, as the case may be, also rides a smaller sprocket 70 fixed upon a midportion of said transverse shaft 68. Each of the opposite ends of the transverse shaft 68 fixedly supports a vertically disposed gear 71 which meshes with horizontally disposed gear teeth 72 upon a lower surface of the disc element 50 at the corresponding side of the planter and in surrounding relation to the corresponding screw bolt 51. Clearly, the feed control or drop plate units 48 will be rotated in response to rotational movement of the set of sprockets 39, 40, 41, and obviously the construction and arrangement can be such as to cause the drop or seed plates 49 to be advanced in the same or opposite direction, inasmuch as all of the concavities 59 are spaced at equal distance apart.

The sprocket 39 fixedly supports three trip pins 73, spaced at 120 degrees apart, adapted to successively engage and throw a trip lever 74, of V-shape as disclosed, thus to cause the gate valves 62 to be opened. More explicitly stated, the trip lever 74 includes an upwardly and rearwardly extending longer arm 75 at the rear thereof adapted to be successively engaged by the trip pins 73 and swung rearwardly and downwardly and an upwardly extending shorter arm 76 at the front thereof having its upper end pivotally secured to the rearward end of the link 64. The trip pins 73 successively strike the longer arm 75 of the trip lever 74 and cause it to be swung rearwardly and downwardly, thus to pull the link 64 rearwardly against resilient action of the tension coil spring 65, to cause the gate valves 62 to be opened, and, after actuation of said trip lever, each of said trip pins rides clear thereof, thus permitting said tension coil spring 65 to return the gate valves to closed position and the trip lever to normal position.

When the planter 15 is advanced over the ground to cause the right drive wheel 24 thereof to be rotated, the unit including the sprockets 39, 40, 41 also will be rotated, provided the elements of the slip clutches 35 and 43 are in engagement, thus to cause the feed control or drop plate unit to be rotated, through the instrumentality of the drive chain 69, the sprocket 70, the transverse shaft 68, the gears 71 and the gear teeth 72, and also cause the gate valves 62 to be successively and intermittently opened and closed, between successive deposits of the seed or kernels of corn contents of adjacent concavities 59 to the passage 56. In each instance, said gate valves 62 will be opened through the instrumentality of a trip pin 73, the trip lever 74, the link 64, the lever 63 and the horizontal shaft 61, and closed, when said trip lever 74 is released by a trip pin, through the instrumentality of the tension coil spring 65, said link 64, said lever 63 and said horizontal shaft 61. Assuming that the drive wheel 24 is advanced at a constant speed with reference to which the operating mechanism of the planter is set, it will be apparent that the construction and arrangement as illustrated and thus far described can be employed to drop seed or kernels of corn in alined hills, two at a time, which are equally spaced and alined with indentations made by the markers, as well as in equally spaced rows the spacing of which will be predetermined by the spacing of the passages 57 through the different vertical members 53. But inasmuch as there is necessity for making straight angle turns between the end of the planting of each two rows and the commencement of the planting of the next two adjacent rows, parallel to the already planted rows, the matter of the alinement of all of the hills to be planted in direction transversely of the rows would be, by employment of the mechanisms as thus far described, a hit or miss proposition. Stated otherwise, at the end of planting each two rows, a straight angle turn must be made before the next two rows can be planted. In making the straight angle turn, the drive wheel 24 will rotate an amount bearing no direct relation to the placement of the planted hills, thus making it necessary in practically all instances to accomplish an adjustment between drive wheel and operating mechanism, including the markers, if the hills of the next two rows to be planted are to aline in direction transversely of the rows with already planted hills. The planter of the present invention incorporates new and improved devices, now to be described, for accomplishing the adjustment above mentioned as necessary, both when the planting of hills, especially the first hills to be planted after a straight angle turn has been made, would be too far backward or too far forward were the new and improved devices not employed.

A brake of the planter includes a brake drum 77, fixed upon the transverse axle 22 at a location between the second clutch element 44 of the clutch 43 and the beam 20, and a brake band 78 upon said brake drum 77 having one of its ends secured, as at 79, to said beam 20. The end of the brake band 78 opposite or spaced from its secured end 79 is connected through the medium of a cross-pin 80 with both the exterior end portion of a longer arm 81 of a lever rotatably supported, as at 82, upon said transverse axle 22 and the rearward end of a first operating rod 83 which extends forwardly and has its forward end portion guided in an upright 84. A hand hold at the forward end of the first operating rod 83, at position to be accessible to an operator of the tractor, is denoted 85. A shorter arm 86 of the lever having the longer arm 81 is connected by a tension coil spring 87 with the beam 20 in such manner as to normally urge said lever to the loose or released position of the brake band 78. The construction and arrangement are such that the brake band 78 will be made taut upon the brake drum 77 in response to pulling ahead of the first operating rod 83, against force of the tension coil spring 87, and upon release of said first operating rod, said tension coil spring will actuate the first operating rod to a rearward position and simultaneously cause the brake band to release the brake drum. See Figs. 4, 6 and 7 wherein 88 indicates a stop on the shorter arm 86 to be engaged against the beam 20 to limit the extent to which the brake band can be loosened or released by reason of force of the tension coil spring 87.

When the markers indicate to an operator of the tractor and planter, especially after a straight angle turn has been made, that hills to be planted would otherwise become existent at the rear of a line extending transversely of already planted rows and including previously planted hills, the operator will pull forwardly upon the first operating rod 83 thus to retard advance movement of the transverse axle 22 and simultaneously permit advance movement of the drive wheel 24 to the extent necessary, indicated by the position of the markers, to cause the next succeeding hills to be planted at the locations where it is desired to plant them. The construction and arrangement will be such that the first and second friction clutch elements 34 and 36 of the slip clutch 35 will ride the one over the other, in the manner as suggested in Fig. 12 of the drawings, when the brake including the drum 77 and the brake band 78 is applied, and immediately upon release of the first operating rod 83, said slip clutch 35 will be returned, by force of the compression coil springs 37, to its operative or driving position. The power necessary to drive the operating elements of the planter, through the slip clutch 35, is relatively small when compared to the braking action which can be readily and easily manually applied to the transverse axle 22 by manipulation of the first operating rod 83, so that the first and second friction clutch elements 34 and 36 of said slip clutch can be engaged under a force amply sufficient to insure that the advancement of said operating elements will not be interrupted during normal operation of the planter and yet engaged under a force weak enough to permit relative slippage of said elements 34 and 36 in response to manual application of braking action upon the transverse axle 22 in the manner as hereinbefore set forth.

Figure 10:
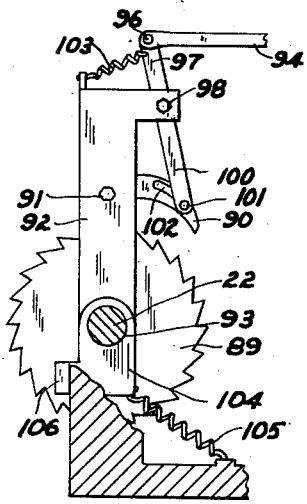
Fig. 10 is a detail sectional view, taken on line 10—10 in Fig. 1.
Figure 11:
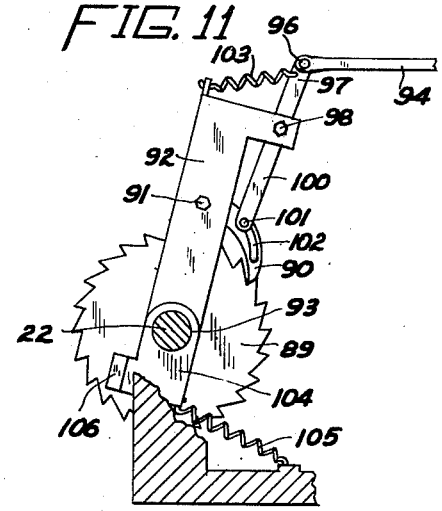
Fig. 11 is a view corresponding generally with the disclosure of Fig. 10, but showing parts in different positions.

A device of the planter for rotatably advancing the transverse axle 22 relative to the drive wheel 24 includes a ratchet wheel 89 fixed upon said transverse axle at a location between the brake drum 77 and the idler wheel 23 and an arcuate dog 90 for accomplishing rotation of said ratchet wheel so that the upper portion of the ratchet wheel moves forwardly and downwardly as in Fig. 1 of the drawings; in clockwise direction in Figs. 10 and 11. The arcuate dog 90 has its interior end pivotally connected, as at 91, upon an intermediate portion of a longer arm 92 of a lever rotatably supported, as at 93, upon said transverse axle 22. A second operating rod 94, which extends forwardly in parallel relation to the first operating rod 83 and has its forward end portion guided in an upright 95, has its rearward end pivotally connected, as at 96, to the upper end of an upper, shorter arm 97 of a lever the intermediate portion of which is pivotally mounted, as at 98, upon an upper part of the longer arm 92. A hand hold at the forward end of the second operating rod 94, at a position to be accessible to an operator of the tractor, is indicated 99. The lower end of a lower, longer arm 100 of the lever pivotally mounted upon an upper part of said longer arm 92 fixedly supports a pin 101 slidably disposed in an elongated slot 102 in an exterior end portion of the arcuate dog 90. The upper, shorter arm 97 is connected by a tension coil spring 103 with the longer arm 92 in such manner as to normally urge the lever having said upper, shorter arm 97 to position to remove the arcuate dog 90 form the ratchet wheel 89, about as disclosed in Fig. 10, and a shorter arm 104 of the lever having said longer arm 92 is connected by a tension coil spring 105 to the beam 20 in such manner as to normally urge this lever to cause said arcuate dog to assume its most rearward position, also as disclosed in said Fig. 10. The construction and arrangement are such that the dog actuating lever will be rotated, against force of the tension coil spring 103, to cause the dog 90 to engage the ratchet wheel 89 and the lever supporting said dog will be rotated, against force of the tension coil spring 105, to cause said ratchet wheel to be advanced, from the position as in Fig. 10 toward or to the position as in Fig. 11, in response to pulling ahead of the second operating rod 94, and upon release of said second operating rod, said tension coil spring 103 will remove the arcuate dog 90 from the ratchet wheel 89 and said tension coil spring 105 will actuate the second operating rod 94 to a rearward position and simultaneously rotate the lever having the longer and shorter arms 92 and 104 to position situating said arcuate dog at its most rearward position, ready to be again actuated to accomplish further rotation ahead of the ratchet wheel 89. See Figs. 10 and 11 wherein 106 denotes a stop on the shorter arm 104 to be engaged against the beam 20 to limit the extent to which the arcuate dog 90 can be swung to rearward position by reason of force of the tension coil spring 105.

When the markers indicate to an operator of the tractor and planter that hills would otherwise become existent at the front of a line extending transversely of already planted rows and including previously planted hills, the operator will pull forwardly upon the second operating rod 94 to accomplish advance movement of the transverse axle 22 relative to the drive wheel 24 to the extent necessary, indicated by the position of the markers, to cause the next succeeding hills to be planted to be situated at the desired locations. Obviously, a single forward pull upon the second operating rod 94 may be sufficient in some instances to obtain the intended result, but if not, forward pulling of said second operating rod can be successively repeated as many times as may be required. The first and second friction clutch elements 34 and 36 of the slip clutch 35 will be caused to ride over each other in the manner as hereinbefore set forth in response to advancement of the ratchet wheel 89, but slippage of said elements 34 and 36 will be in direction opposite that which occurs when braking action is applied to the transverse axle 22 to the accomplishment of retarding advance movement of said transverse axle.

More satisfactory operating results are accomplished when planters of the general character as herein illustrated and described are advanced at speeds for which the operating elements of the planters have been set than when the planters are advanced at speeds not compatible with the setting of their operating elements. Stated differently, advancing planters of the present type at variable speeds for which they are not initially set will result in producing irregularly related planted hills; that is, hills not in longitudinal and transverse alinement.

The operative elements of the planter of the invention can be adjusted for any desired speed of advancement which may be selected merely by relative rotary adjustment of the first and second clutch elements 42 and 44 of the clutch 43 while the planter is inoperative. For increased speeds of planter advancement, said first and second clutch elements 42 and 44 will be initially relatively rotatably adjusted to cause dropping of the seed or kernels of corn to occur earlier, and for decreased speeds of planter advancement, the first and second clutch elements 42 and 44 will be initially relatively rotatably adjusted to cause dropping to occur later. Stated otherwise, for faster planter advancement, the clutch 43 will be initially adjusted to cause the set of sprockets 39, 40, 41 to be situated in an advanced position upon the transverse axle 22 relative to the position of the markers, and for slower planter advacement, said clutch 43 will be initially adjusted to cause said set of sprockets 39, 40, 41 to be situated in a retrogressed position upon said transverse axle relative to the position of said markers.

It will be understood that the diameter of the drive sprocket employed will predetermine the spacing of the planted hills, and that the set of drive sprockets utilized can include more than three drive sprockets. And, too, the spacing between rows to be planted can be readily and easily increased or decreased merely by adjusting, in a manner forming no part of the present invention, the distance between the different seed dropping units at the opposite sides of the frame 17.

It will be apparent that the first operating rod 83 and the mechanism actuated thereby constitute means for arresting rotation of the axle while the drive wheel advances thus to cause relative rotative adjustment of the axle and drive wheel to be accomplished to situate said axle in retrogressed position with respect to the drive wheel. Also it will be apparent that the second operating rod 94 and the mechanism actuated thereby constitute means for relatively rotatatively adjusting the axle and drive wheel to situate said axle in an advanced position relative to said drive wheel.

What is claimed is:

A planter comprising a mobile frame, an actuatable mechanism on said frame operative to accomplish a seed planting, an axle mounted for rotation on said frame, a driving connection between said axle and said mechanism operative to actuate said mechanism with rotation of said axle, a ground-penetrating instrument fixed to and rotatable with said axle to produce an indentation in the ground indicative of a seed planting location, a ground-engaging drive wheel journaled on said axle, a first slip clutch on said axle releasably connecting the axle to said drive wheel to be rotated thereby, a manually operable brake means fixed to said axle for arresting rotary movement of said axle while said drive wheel is rotating forwardly to cause slippage of said first slip clutch and accomplish advance rotational adjustment of said drive wheel relative to said axle and the associated mechanism and instrument, a manually operable device on said axle for rotating said axle in a direction relative to said drive wheel while the drive wheel is engaged with the ground to cause slippage of said first slip clutch and accomplish advance rotational adjustment of said axle and the associated mechanism and instrument, and a second slip clutch on said axle releasably connecting the axle to said driving connection, said second slip clutch including complemental clutch elements initially relatively rotatably adjusted to coordinate the timing of the actuation of said mechanism relative to the timing of said instrument for producing an indentation in the ground.

References Cited in the file of this patent

UNITED STATES PATENTS

| | | |
|---|---|---|
| 167,514 | Fawkes | Sept. 7, 1875 |
| 264,794 | Thomson | Sept. 19, 1882 |
| 270,428 | Hanson | Jan. 9, 1883 |
| 328,160 | Waterman | Oct. 13, 1885 |
| 365,700 | Norris | June 28, 1887 |
| 500,909 | Kessler | July 4, 1893 |
| 594,037 | Scobee et al. | Nov. 23, 1897 |
| 682,153 | Swonson | Sept. 3, 1901 |
| 845,808 | McKee | Mar. 5, 1907 |
| 914,858 | Moffitt | Mar. 9, 1909 |
| 1,097,351 | Noel | May 19, 1914 |
| 1,330,586 | Henebergh | Feb. 10, 1920 |
| 1,890,136 | Thelen et al. | Dec. 6, 1932 |